US009625734B2

(12) United States Patent
Dobermann et al.

(10) Patent No.: US 9,625,734 B2
(45) Date of Patent: Apr. 18, 2017

(54) IMAGE-STABILIZED LONG-RANGE OPTICAL DEVICE

(71) Applicants: Carl Zeiss Sports Optics GmbH, Wetzlar (DE); Carl Zeiss AG, Oberkochen (DE)

(72) Inventors: Dirk Dobermann, Magdala OT Ottstedt (DE); Rainer Robotta, Jena OT Closewitz (DE); Georg Guenther, Grosschwabhausen (DE); Jens Hofmann, Jena (DE); Kurt Becker, Wettenberg (DE); Eckhard Roth, Grossloebichau (DE); Tobias Thiele, Erfurt OT Mittelhausen (DE)

(73) Assignees: Carl Zeiss Sports Optics GmbH, Wetzlar (DE); Carl Zeiss AG, Oberkochen (DE)

( * ) Notice: Subject to any disclaimer, the term of this patent is extended or adjusted under 35 U.S.C. 154(b) by 275 days.

(21) Appl. No.: 14/330,732

(22) Filed: Jul. 14, 2014

(65) Prior Publication Data

US 2014/0320963 A1     Oct. 30, 2014

Related U.S. Application Data

(63) Continuation of application No. PCT/EP2013/050176, filed on Jan. 8, 2013.
(Continued)

(30) Foreign Application Priority Data

Jan. 13, 2012 (DE) .................. 10 2012 000 858

(51) Int. Cl.
| G02B 27/64 | (2006.01) |
| F16F 15/03 | (2006.01) |
| G02B 23/02 | (2006.01) |

(52) U.S. Cl.
CPC .......... G02B 27/646 (2013.01); F16F 15/035 (2013.01); G02B 27/644 (2013.01); G02B 23/02 (2013.01)

(58) Field of Classification Search
CPC .... G02B 27/646; G02B 27/644; G02B 27/64; G02B 23/02; G02B 23/00; G02B 23/18;
(Continued)

(56) References Cited

U.S. PATENT DOCUMENTS

| 2,688,456 A | 8/1949 | Jensen |
| 2,829,557 A | 1/1950 | Jensen |

(Continued)

FOREIGN PATENT DOCUMENTS

| DE | 21 52 085 | 4/1973 |
| DE | 23 53 101 | 5/1974 |

(Continued)

OTHER PUBLICATIONS

Tonoli, Andrea, "Dynamic characteristics of eddy current dampers and couplers" Journal of Sound & Vibration, London, GB bd. 301, Nr. 3-5, Jan. 27, 2007, pp. 576-591, XP005737506.

*Primary Examiner* — Bumsuk Won
*Assistant Examiner* — Collin X Beatty
(74) *Attorney, Agent, or Firm* — Muirhead and Saturnelli, LLC

(57) ABSTRACT

A long-range optical device has at least one optical channel which comprises a housing and an arrangement of optical elements. At least one of the optical elements is movable relative to the housing for image stabilization in the event of perturbing movements of the housing. The device further comprises a stabilization system for the at least one movable optical element, which has an eddy current damper for damping movements of the at least one movable element. The stabilization system, in the event of a displacement of
(Continued)

the at least one movable optical element, generates a restoring force proportional to the displacement velocity of the at least one movable optical element. The eddy current damper comprises a magnet system and an eddy current carrier interacting therewith. The restoring force generated by the eddy current damper is dependent on the amplitude of the displacement of the at least one movable optical element.

38 Claims, 6 Drawing Sheets

Related U.S. Application Data

(60) Provisional application No. 61/586,315, filed on Jan. 13, 2012.

(58) Field of Classification Search
CPC .......... F16F 15/035; G06F 3/0346; G06F 2200/1637; F41G 7/2213; F41G 5/16; G02F 1/29; H04N 5/23248; H04N 5/23287; H04N 5/23258; H04N 5/2328; H04N 5/2254; H04N 5/23264; G03B 5/00; G03B 2205/0069; G03B 2205/0023; G03B 2205/0007
USPC .................................................. 359/554–557
See application file for complete search history.

(56) References Cited

U.S. PATENT DOCUMENTS

| | | | | |
|---|---|---|---|---|
| 3,910,693 A * | 10/1975 | De La Cierva | ........ | F16M 13/04 352/244 |
| 4,260,218 A * | 4/1981 | Gullicksen | ........... | G02B 27/644 356/248 |
| 4,465,346 A | 8/1984 | Fraser | | |
| 4,615,590 A * | 10/1986 | Alvarez | ................. | G02B 27/64 359/556 |
| RE33,548 E * | 3/1991 | Kime | .................... | G11B 7/093 359/554 |
| 5,029,995 A | 7/1991 | Weyrauch et al. | | |
| 5,243,462 A | 9/1993 | Kobayashi et al. | | |
| 5,736,798 A * | 4/1998 | O'Brien | ................. | B24B 13/00 310/103 |
| 5,771,069 A * | 6/1998 | Kobayashi | ........... | G02B 27/646 348/208.11 |
| 6,293,680 B1 * | 9/2001 | Bruns | ................ | G02B 26/0825 359/846 |
| 6,587,270 B2 * | 7/2003 | Terada | ..................... | G03B 5/00 359/554 |
| 8,203,702 B1 * | 6/2012 | Kane | ......................... | G01J 3/02 356/139.05 |
| 8,752,969 B1 * | 6/2014 | Kane | .................... | G02B 7/1821 356/139.05 |
| 2002/0159769 A1 * | 10/2002 | Fujinaga | .................. | G03B 5/00 396/55 |
| 2012/0160621 A1 * | 6/2012 | Battlogg | ................ | B60G 17/08 188/267.2 |
| 2013/0038781 A1 * | 2/2013 | Inaji | ...................... | H02P 23/005 348/357 |

FOREIGN PATENT DOCUMENTS

DE    38 43 776 A1    7/1990
JP    01307543    12/1989

* cited by examiner

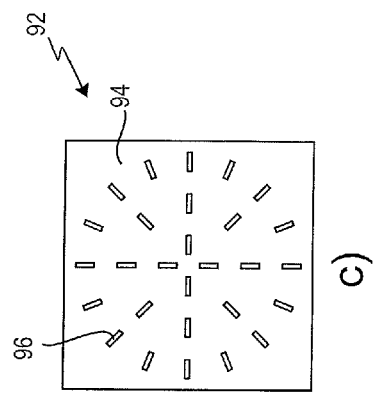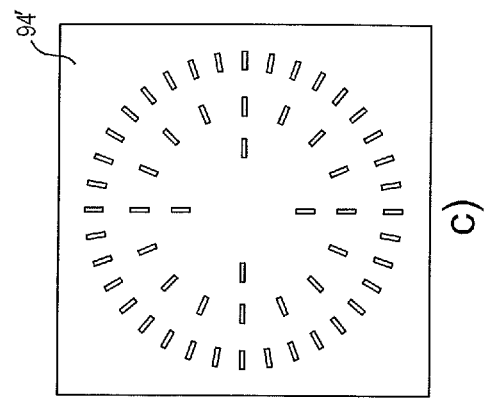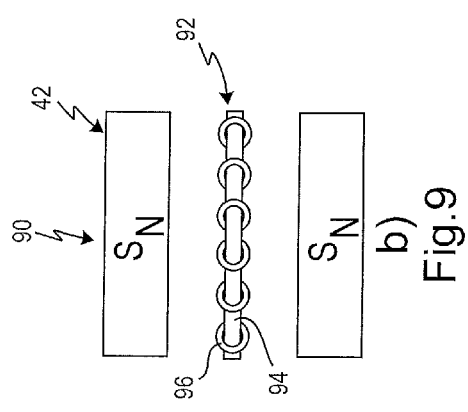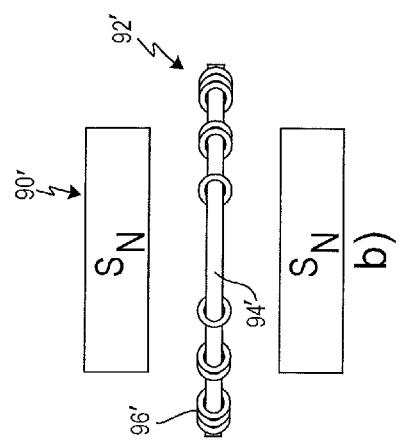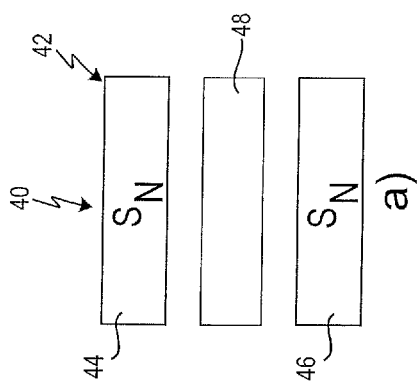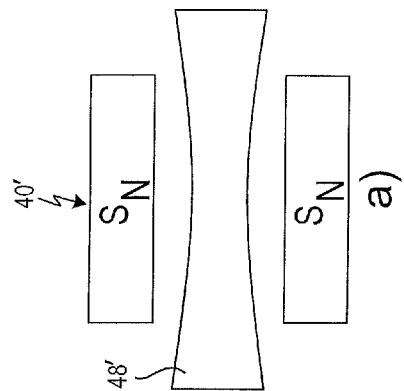
Fig. 9
Fig. 10

IMAGE-STABILIZED LONG-RANGE OPTICAL DEVICE

CROSS REFERENCES TO RELATED APPLICATIONS

This application is a continuation of international patent application PCT/EP2013/050176, filed on January 8 designating the U.S., which international patent application has been published in German language and claims priority from German patent application No. 10 2012 000 858.9, filed on Jan. 13, 2012, and from U.S. provisional patent application No. 61/586,315 filed on Jan. 13, 2012. The entire contents of these priority applications are incorporated herein by reference.

BACKGROUND OF THE INVENTION

The invention relates to a long-range optical device. A long-range optical device may, in the context of the present invention, be a monocular or binocular telescope, in particular binoculars.

During the use of a long-range optical device, for example binoculars, perturbing movements of the housing of the long-range optical device have a detrimental effect on the image quality of the image seen by the user. The perturbing movements acting on the housing lead to shaking of the image, which compromises the observation of an object or scenery.

Long-range optical devices have therefore been proposed in which the at least one optical channel contains at least one optical element which is movable relative to the housing, as well as a stabilization system for the at least one movable optical element for image stabilization in the event of perturbing movements. By virtue of the relative movability of the at least one optical element in the beam path of the optical channel, this optical element, and therefore the imaging, is decoupled in terms of movement from the housing. Despite perturbing movements, therefore, the user perceives an image which is free of shaking, or has little shaking.

In the long-range optical device known from the document DE 38 43 776 A1, the at least one movable optical element is the image inverting prism, which is gimbal supported in the housing by means of a torsion spring joint. The stabilization system of this known long-range optical device comprises an eddy current damper for damping movements of the inverting prism. The eddy current damper generates a restoring force proportional to the displacement velocity of the image inverting prism during displacement of the image inverting prism. The eddy current damper prevents the image inverting prism from being excited in forced oscillations in the housing.

The eddy current damper of this known long-range optical device comprises a magnet system moved with the image inverting prism, which is formed by permanent magnets, and a plane-parallel plate made of an electrically conductive material, for example copper. The eddy current carrier formed as a plate has a constant cross section and has indentations in the edge region, so that axis-wise adjustment of the damping constant is possible, particularly while taking into account different spring constants of the torsion spring articulation and the inertial mass of the movable components. The eddy current carrier, formed as a plate, is connected firmly to the housing.

An eddy current damper as a damping device of the stabilization system has the advantage that initial friction is minimal, which is not the case for example in a damping device which is based on the principle of damping by fluid friction. Long-range optical devices comprising image stabilization units which are based on damping by the fluid friction are known from DE 2 152 085 A and DE 2 353 101 A.

U.S. Pat. No. 2,688,456 and U.S. Pat. No. 2,829,557 describe damping devices, which consist of two magnet systems, in long-range optical devices. A bar magnet fastened on the stabilization system is arranged in a magnetic cylinder fixed to the housing. In this case, the mutual repulsion forces cause damping of the movement of the at least one movable optical element.

SUMMARY OF THE INVENTION

It is an object of the invention to further improve a long-range optical device in respect of the image stabilization in the event of perturbing movements of the housing.

According to an aspect, a long-range optical device is provided, comprising at least one optical channel having a housing and an arrangement of optical elements, at least one of the optical elements being movable relative to the housing for image stabilization in the event of perturbing movements of the housing. A stabilization system for the at least one movable optical element has an eddy current damper for damping movements of the at least one movable element, the eddy current damper in the event of a displacement of the at least one movable optical element generating a restoring force proportional to the displacement velocity of the at least one movable optical element, the restoring force being dependent on an amplitude of the displacement of the at least one movable optical element.

The long-range optical device according to the invention employs the concept of equipping the stabilization system with an eddy current damper for damping oscillations of the at least one movable element, so that in contrast to damping devices based on fluid friction the initial friction is low. By any initial friction, the stabilization system is frictionally coupled to the housing in the event of small signals, so that the stabilization system cannot compensate for the perturbing signals. This is avoided by the use of an eddy current damper. By virtue of the dependency of the restoring force on the amplitude of the displacement of the at least one movable optical element, depending on the configuration of the eddy current damper, for example, larger displacements of the at least one movable optical element may be damped more strongly. The eddy current damper may, however, also be configured in such a way that the at least one movable optical element is carried along in an improved way in the event of intended panning of the long-range optical device, when the user wishes to move the view through the long-range optical device over terrain.

In an embodiment, the at least one movable optical element is fastened on a carrier which is movable relative to the housing, the magnet system is fixed relative to the housing and the eddy current carrier is fixed relative to the carrier.

This constitutes reversal of the arrangement of the magnet system and of the eddy current carrier in relation to the known long-range optical device mentioned in the introduction. The arrangement of the magnet system and of the eddy current carrier according to the aforementioned preferred configuration has the advantage that, in conjunction with a movable optical element of low mass, for example an image inverting prism, at the other end of the carrier, a much lighter stabilization system is provided. Furthermore, the modifications yet to be described below can be carried out more easily on a magnet system which is not moved, without having to rebalance the entire stabilization system.

In another preferred embodiment, the restoring force increases or decreases with an increasing amplitude of the displacement.

If the restoring force, or damping, increases with an increasing amplitude of the displacement of the at least one movable optical element, larger displacements are damped more strongly, so that very good image stabilization is achieved even in the event of perturbing movements with a high excitation amplitude.

In another preferred embodiment, the restoring force is dependent on the direction of the displacement of the at least one movable optical element.

In this case, it is advantageous that the damping of a movement of the at least one movable optical element, for example about a horizontal axis transverse to the optical axis, may be greater or less than in the event of a movement of the at least one movable optical element about the vertical axis. In this way, the image stabilization can be adapted to different applications of the long-range optical device.

For instance, it may be preferred for the restoring force to be equal in two mutually perpendicular direction components of the displacement of the at least one movable optical element, or for the restoring force to be different in two mutually perpendicular direction components of the displacement of the at least one movable optical element.

In the first case, the damping of the eddy current damper is "isotropic", while in the second case it is "anisotropic".

In another preferred embodiment, the restoring force is adjustable.

This has the advantage that the user of the long-range optical device may himself set the desired damping characteristic according to the application.

In another preferred embodiment, the eddy current carrier comprises at least one plate, which extends radially with respect to the longitudinal axis of the optical channel.

With this measure, the eddy current carrier is very simple in design terms, and is therefore advantageously particularly economical to manufacture.

In this case, it is preferred for the thickness of the plate to increase or decrease toward the edge.

With this measure, the instantaneous displacement dependency of the restoring force, or of the damping, is achieved in a way which is straightforward to carry out by a thickness variation of the plate of the eddy current carrier.

In this case, the thickness of the plate preferably increases or decreases continuously or stepwise toward the edge.

In this case, it is also possible for the restoring force not to increase or decrease uniformly; rather, depending on the desired damping characteristic, the thickness of the plate increases or decreases superproportionally or subproportionally toward the edge.

If the damping characteristic is not intended to have a direction dependency, the thickness of the plate preferably increases or decreases equally in two mutually perpendicular spatial directions toward the edge.

If, on the other hand, a direction dependency of the damping characteristic is desired, the thickness of the plate preferably increases or decreases differently in two mutually perpendicular spatial directions toward the edge.

In an embodiment of the two configurations mentioned above, a thickness profile of the plate preferably increases or decreases in a rectangular, square, circular or elliptical shape toward the edge.

A square thickness profile and a circular thickness profile lead to a displacement-dependent damping characteristic which is not direction-dependent, and a non-square rectangular or elliptical thickness profile lead to a direction-dependent displacement-dependent damping characteristic. The elliptical thickness profile also has the advantage that, in the event of a perturbing movement which excites the at least one movable optical element simultaneously in two mutually perpendicular spatial directions, a more uniform transition of the damping is produced between pure displacement in the first spatial direction and pure displacement in the second spatial direction, perpendicular thereto, compared for example with the rectangular thickness profile.

In order to implement the measures mentioned above in a way which is simple in design terms, according to another preferred embodiment the plate comprises at least one surface which is curved, the radius of curvature being constant or variable over the at least one surface.

In the case of a constant radius of curvature of the at least one surface of the plate of the eddy current carrier, the restoring force decreases or increases proportionally to the displacement of the at least one movable element, and in the case of a varying radius of curvature the damping characteristic may be configured in such a way that the restoring force increases or decreases superproportionally or subproportionally as a function of the displacement of the at least one movable optical element.

In another preferred embodiment, a radial midaxis between the surfaces of the plate is straight.

In this embodiment, the plate can be produced particularly straightforwardly since it can be made from a plane-parallel plate into which corresponding surface contours can be incorporated.

It may, however, likewise be preferred for a radial midaxis between the surfaces of the plate to be curved.

In this case, the geometry of the plate of the eddy current carrier is adapted better to the movement of the at least one movable optical element when this movement corresponds to a rotation movement about a rotation point, as is the case when the at least one movable optical element is supported by means of a torsion spring joint. In other words, in this embodiment, the geometry of the plate of the eddy current carrier according to one of the embodiments mentioned above, for example with a varying thickness, is superimposed with a curvature of the plate as a whole, in which case the latter curvature may for example be spherical, which corresponds best to the rotational or swiveling movement of the at least one movable optical element about a rotation point.

In conjunction with the two embodiments mentioned last, according to another preferred embodiment the magnet system comprises at least one magnet, which extends radially with respect to the longitudinal axis of the optical channel, and the at least one magnet comprises at least one surface which is straight or curved, in such a way that the distance from the plate to the at least one magnet varies over the plate.

According to this embodiment, an instantaneous displacement dependency of the restoring force, or of the damping, of the eddy current damper is not achieved, or is not achieved only, by a corresponding geometry of the eddy current carrier, but rather only or additionally by a corresponding geometry of the at least one magnet of the magnet system, the geometry of the plate of the eddy current carrier and the geometry of the at least one magnet being adapted to one another in such a way that the distance from the plate to the at least one magnet varies over the plate, so that different damping is again obtained depending on the displacement.

In another preferred embodiment, the plate comprises a first plate and a second plate, each of which is provided with radial recesses, the first plate and the second plate being arranged next to one another in the longitudinal direction of the optical channel and being positionally adjustable relative to one another, in order to enlarge or reduce the radial recesses reciprocally in terms of their area.

This embodiment is a preferred configuration for production of the eddy current damper with an adjustable damping characteristic. Preferably, the first plate and the second plate are each electrically conductive, and electrically conductively connected to one another by bearing on one another in the longitudinal direction of the optical channel. By relative position adjustment, for example rotation, of the first plate and the second plate with respect to one another, the radial recesses have their area increased or decreased, so that the conductive segments of the overall arrangement consisting of the first plate and the second plate correspondingly become larger or smaller, and larger or smaller eddy currents can correspondingly be formed therein, which varies the damping characteristic accordingly.

In a preferred embodiment which is particularly simple to produce, the plate itself is electrically conductive.

In this case, it is advantageous that the plate of the eddy current carrier can particularly straightforwardly be manufactured in one piece overall from an electrically conductive material, for example copper.

In order to obtain a displacement-dependent damping characteristic in this particularly simple configuration, the electrical conductivity and/or magnetic permeability of the plate preferably varies over the plate.

In this case, it is advantageous that the plate itself can be produced in a geometrically very simple way, for example as a plane-parallel plate, while the displacement-dependent damping characteristic of the eddy current damper is provided by the material properties, conductivity and/or magnetic permeability. For example, the conductivity of the plate may be modified radially by mechanical stresses in the crystal lattice. Another example consists in radially modifying the magnetic flux, continuously or stepwise, by different magnetisation of individual zones of the plate.

The embodiment mentioned above may however also be combined with a geometrically induced displacement dependency, as described above, of the damping characteristic (for example by thickness variation of the plate).

As an alternative to an electrically conductive plate, it is preferred for the plate not to be electrically conductive, and for it to carry at least one coil in which the eddy currents are generated.

In this case, the at least one coil may preferably be formed as a conductive wire which is coiled or is wound through the plate, or likewise preferably as a conductive track on the plate.

The use of at least one coil on an otherwise electrically nonconductive plate has the advantage that the plate itself can be manufactured with a simple geometry, for example plane-parallel, while the coils then generate the displacement-dependent damping characteristic by a corresponding arrangement, distribution and configuration.

Thus, according to another preferred embodiment, the number of windings, the winding cross section and/or the conductive wire or conductive track cross section varies/vary over the plate.

In a straightforward way, this offers numerous possibilities for achieving a displacement dependency of the damping characteristic, whether direction-independently or direction-dependently in relation to the displacement of the at least one movable optical element.

For a direction dependency of the damping characteristic, according to another preferred embodiment the plate carries at least two coils in which eddy currents are generated, and the at least two coils are oriented in different spatial directions to one another.

The at least two coils may be fully separated from one another electrically, or, as according to another preferred embodiment, may be electrically coupled to one another, preferably via a resistor.

In the latter case, the damping characteristics produced by the at least two coils may be coupled with one another in the two preferential directions.

When the coils are coupled via a resistor, the resistor is preferably adjustable.

The advantage achieved by this is that the damping characteristic is adjustable, and in particular can be varied manually, either during production of the long-range optical device or during use of the long-range optical device by a user.

Another possibility for obtaining a displacement-dependent damping characteristic of the eddy current damper is, as according to another preferred embodiment, that the magnet system generates an inhomogeneous magnetic field over the eddy current carrier.

For example, the magnetic field generated by the magnet system may have a higher field line density toward the edge of the eddy current carrier than in the middle of the eddy current carrier. In this embodiment the eddy current carrier, which is formed for example in a simple case as an electrically conductive plate, should be smaller than the extent of the magnetic field generated by the magnet system. If, owing to a displacement of the at least one movable optical element relative to the housing, with increasing displacement, the plate of the eddy current carrier enters the regions of the magnetic field lying further toward the edge, the magnetic flux density changes, and therefore so does the induced eddy current, and a displacement-dependent restoring force or damping of the eddy current damper is generated. Of course, the aforementioned measures may also be combined with, for example, one of the embodiments mentioned above, according to which the plate of the eddy current carrier has a thickness varying toward the edge.

In order to generate an inhomogeneous magnetic field, as described above, the magnet system comprises at least one magnet, the geometry of which is selected in such a way that the at least one magnet generates an inhomogeneous magnetic field, and/or the at least one magnet has a position-dependent remanence.

In both embodiments mentioned above, the generation of an inhomogeneous magnetic field is therefore achieved by the geometry and/or the material selection and distribution of the at least one magnet of the magnet system.

The desired magnetic field line geometry for generating an inhomogeneous magnetic field may, however, also be produced by the magnet system comprising at least one coil which can be excited by a current, in order to generate an inhomogeneous magnetic field.

In order to achieve a direction dependency of the restoring force of the eddy current damper in this case, the magnet system may comprise at least two coils which can be excited by different current strengths.

Other advantages and features may be found in the following description and the appended drawing.

It is to be understood that the features mentioned above and those yet to be explained below may be used not only in the combination respectively indicated, but also in other combinations or individually, without departing from the scope of the present invention.

BRIEF DESCRIPTION OF THE DRAWINGS

Exemplary embodiments of the invention are represented in the drawing and will be explained in even more detail with respect thereto here.

FIG. 9a) shows the eddy current damper in FIG. 2a) and
FIGS. 9b) and c)
show alternative configurations of the eddy current damper in FIG. 9a);

FIG. 10a) shows the eddy current damper in FIG. 2b) and
FIGS. 10b) and c)
show alternative configurations of the eddy current damper in FIG. 10a);

DESCRIPTION OF PREFERRED EXEMPLARY EMBODIMENTS

Figure 1:
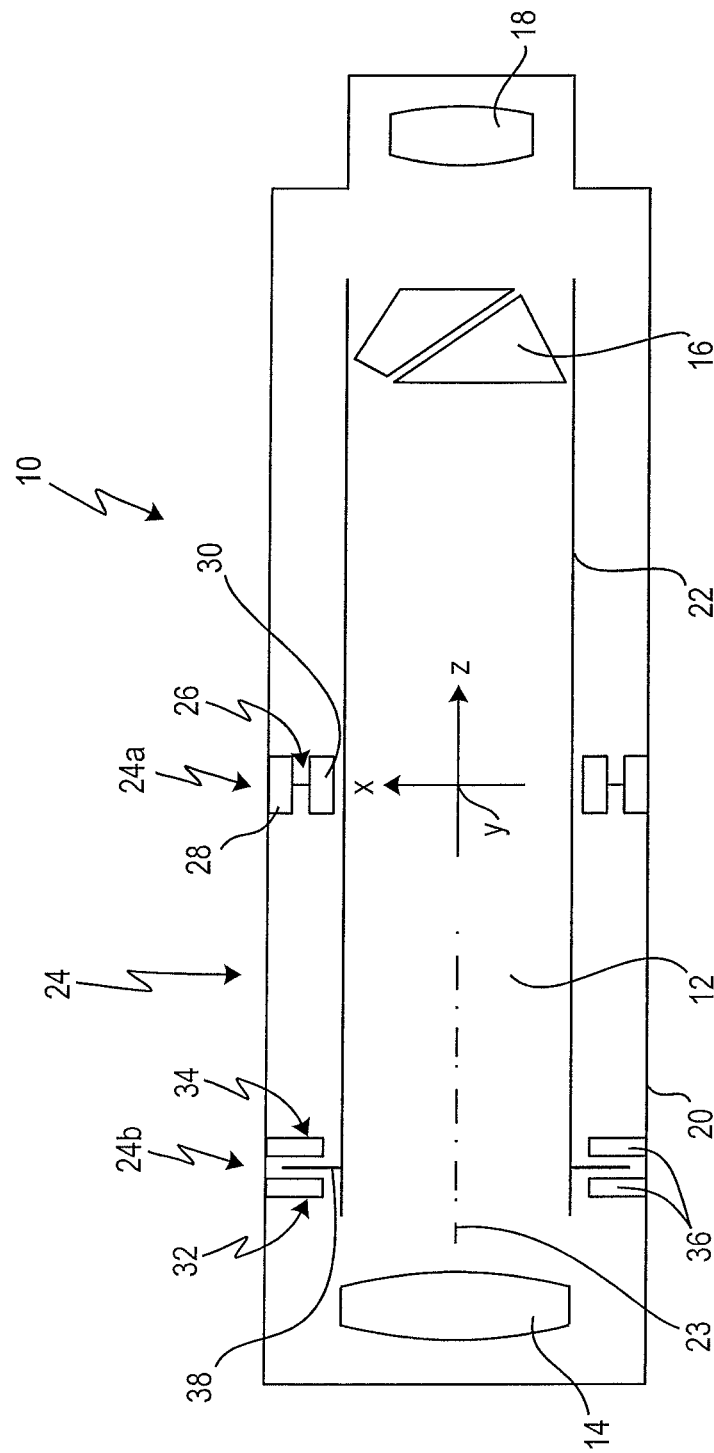
FIG. 1 shows the basic structure of a long-range optical device with image stabilization.
Figure 2:
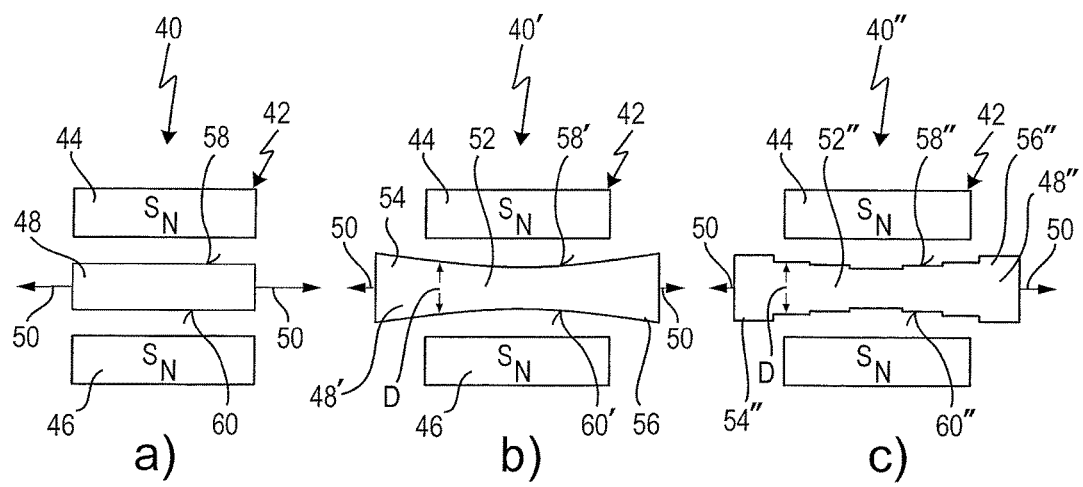
FIGS. 2a) to c)
show eddy current dampers in various embodiments for use in the long-range optical device in FIG. 1.
Figure 4:
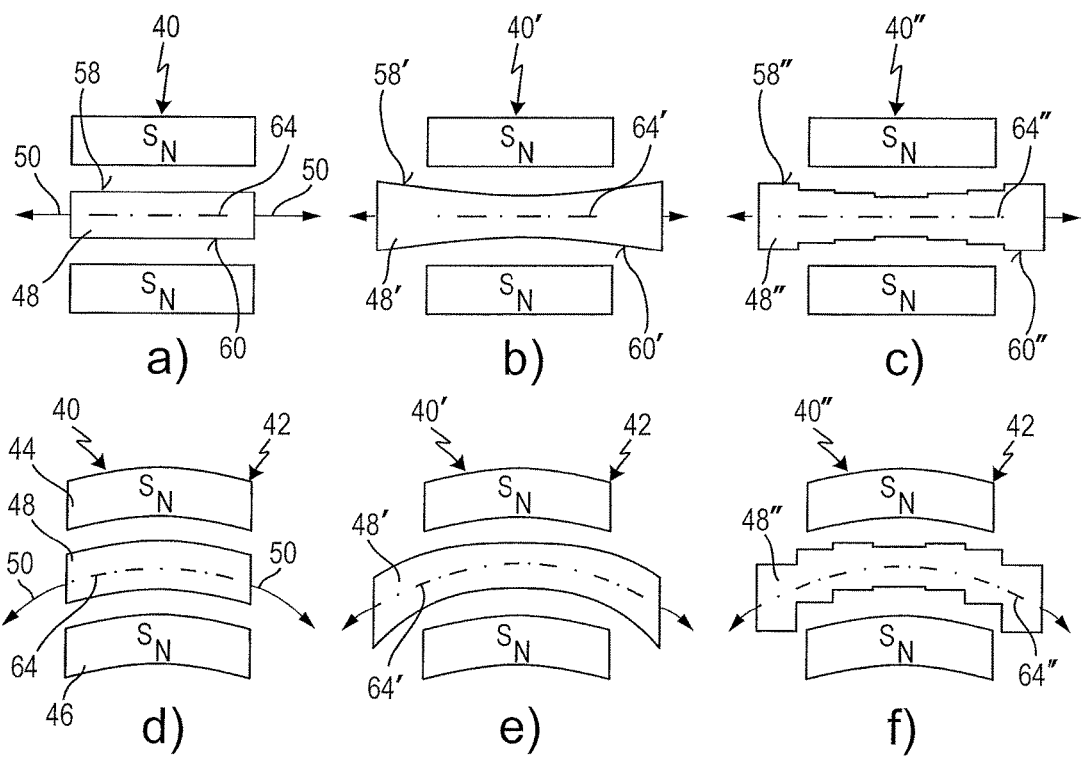
FIGS. 4a) to c)
show the eddy current dampers in FIG. 2a) to c)
FIGS. 4d) to f)
show modifications of the eddy current dampers in FIG. 4a) to c)
Figure 3:
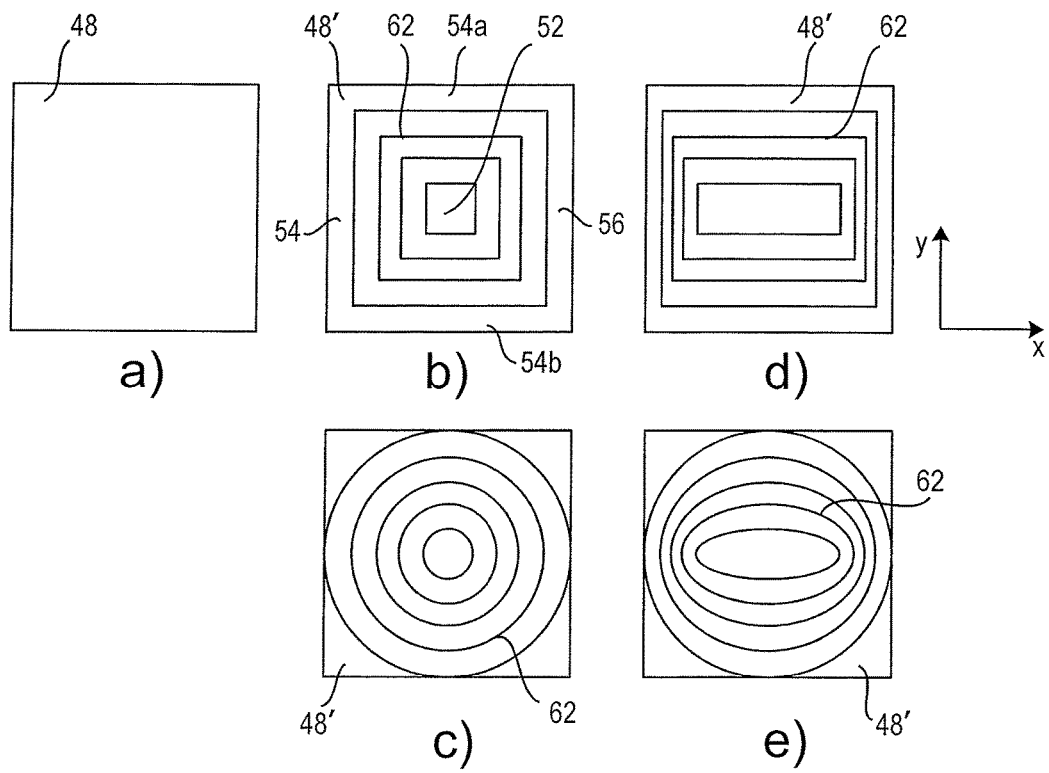
FIGS. 3a) to e)
show thickness profiles of various eddy current carriers for eddy current dampers for use in the long-range optical device in FIG. 1.
Figure 5:
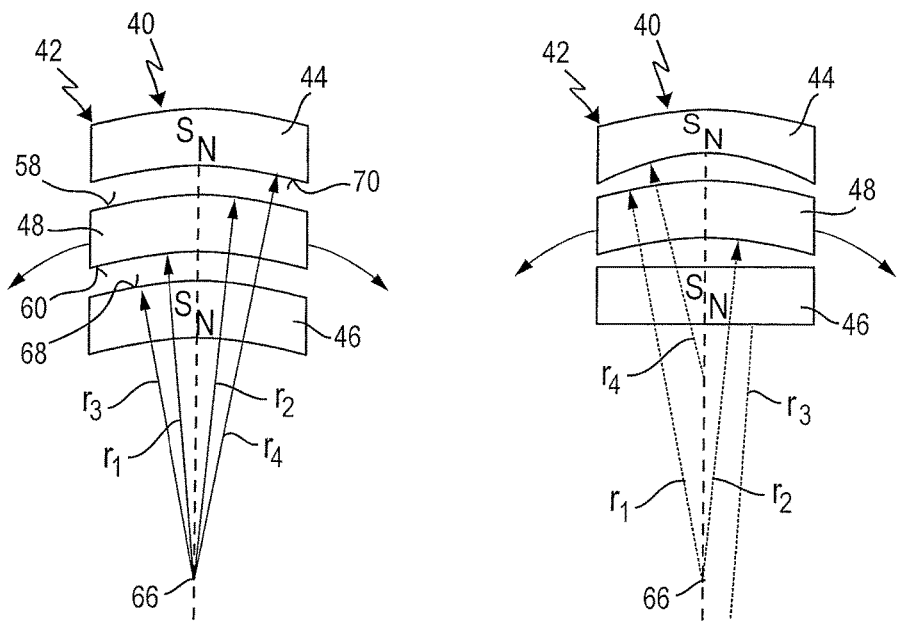
FIG. 5a) shows the eddy current damper in FIG. 4d) and
FIG. 5b) shows a modification of the eddy current damper in FIG. 5a)

FIG. 1 shows the basic structure of a long-range optical device, provided with the general reference 10, which is equipped with image stabilization.

The long-range optical device 10 may be formed as a binocular or monocular telescope, in particular as binoculars. In the case of a monocular telescope, the long-range optical device has one optical channel 12. In the case of configuration of the long-range optical device 10 as a binocular telescope, the long-range optical device 10 correspondingly has a second optical channel, which is not represented in FIG. 1.

Optical elements 14, 16 and 18 are arranged in the optical channel 12. The optical elements 14, 16 and 18 are represented in a simplified way here, the optical element 14 forming the objective lens, the optical element 16 forming the image inverting system, and the optical element 18 forming the eyepiece of the long-range optical device 10. The optical channel 12 has a housing 20, in which the arrangement of the optical elements 14, 16 and 18 is accommodated.

For image stabilization in the event of perturbing movements of the housing 20, the optical element 16 that is to say the image inverting system, is movable relative to the housing 20. In FIG. 1, a coordinate system x, y, z is indicated in the optical channel 12, z denoting the light propagation direction inside the optical channel 12, x denoting the horizontal axis transverse to the light propagation direction, and y denoting the vertical axis or height axis of the long-range optical device 10. The vertical axis y extends here perpendicularly to the plane of the drawing in FIG. 1. For image stabilization, the optical element 16 is supported in the housing 20 in such a way that it can swivel about the x axis and the y axis. The optical element 14 and the optical element 18 are positionally fixed with respect to the housing 20.

The movable optical element 16 is firmly connected to a carrier 22, the carrier 22 being swivelable in gimbal fashion about the aforementioned x axis and the aforementioned y axis. The rotation point of this swiveling movement in FIG. 1 is the origin of the x, y, z coordinate system indicated, and lies in particular on the optical axis 23. The carrier 22, together with the parts fastened thereon, is balanced with respect to the rotation point.

For image stabilization in the event of perturbing movements of the housing 20, that is to say when the housing 20 shakes, the long-range optical device 10 has a stabilization system 24 for the movable optical element 16, which is formed as a passive stabilization system based on mass inertia.

The stabilization system 24 has a first member 24a and a second member 24b. In the event of a displacement of the optical element 16 relative to the housing 20, the first member 24a generates a first restoring force proportional to this displacement. amplitude The first member 24a is in this case formed as a spring joint 26, which has one rotational degree of freedom about the x axis and one rotational degree of freedom about the y axis. The spring joint 26 comprises on the one hand an interface 28 with the housing 20, and an interface 30 with the carrier 22, and therefore with the optical element 16.

The second member 24b is formed as an eddy current damper 32 which, in the event of a displacement of the optical element 16, or of the carrier 22, relative to the housing 20, generates a restoring force proportional to the displacement velocity. The eddy current damper 32 has a magnet system 34, which comprises for example magnets 36, and an eddy current carrier 38. The eddy current carrier 38 is firmly connected to the carrier 22, and the magnet system 34 is firmly connected to the housing 20. The magnet system 34 and the eddy current carrier 38 extend essentially or exactly perpendicularly to the optical axis 23.

The eddy current damper 32 causes damping of movements of the movable optical element 16, or of the carrier 22, by the eddy current damper 32 generating the aforementioned restoring force proportional to the displacement velocity of the optical element 16. In the event of a displacement of the movable optical element 16, or of the carrier 22, in cooperation with the magnet system 34 eddy currents which counteract the displacement of the carrier are generated in the eddy current carrier 38. In other words, the restoring forces generated by the eddy current damper 32 counteract accelerations of the carrier 22, and therefore of the optical element 16.

The eddy current damper 32 is configured in such a way that the restoring force proportional to the displacement velocity of the movable optical element 16 is dependent on the amplitude of the displacement of the movable optical element 16.

Various exemplary embodiments, according to which the eddy current damper 32 may be configured in order to generate a restoring force, and therefore damping characteristic, dependent on the amplitude of the displacement of the movable optical element 16, will be described below with reference to the other figures.

FIGS. 2 to 8 show various exemplary embodiments in which the restoring force, or in which the damping characteristic, is dependent on the amplitude of the displacement of the movable optical element 16 owing to different geometries of the eddy current carrier and/or of the magnet system.

In the figures below, the respective magnet system and the eddy current carrier are represented rotated through 90° relative to FIG. 1. That is to say, when installed in the long-range optical device 10, the eddy current carriers and magnet systems to be described below extend, as in the eddy current damper 32 in FIG. 1, radially with respect to the longitudinal axis or optical axis 23 of the optical channel 12.

FIG. 2a) shows an eddy current damper 40 having a magnet system 42, which is represented here by two permanent magnets 44 and 46, and an eddy current carrier 48. Here and in the following figures, arrows 50 indicate the relative movability of the eddy current carrier 48 relative to the magnet system 42. Here and in the other figures, S and N denote the magnetic poles (south pole and north pole).

In the eddy current damper 40, the eddy current carrier 48 is formed as a plane-parallel electrically conductive plate. In the event of a displacement of the eddy current carrier 48 relative to the magnet system 42 according to the arrows 50, in this case there is no dependency of the damping characteristic on the amplitude of the displacement of the eddy current carrier 48, and therefore of the movable optical element 16.

FIG. 2b) in turn shows an eddy current damper 40' in a configuration in which the eddy current carrier 48' is again formed as a plate, but one whose thickness D increases from the middle toward the edges 54 and 56. In this way, the cross section of the plate of the eddy current carrier 48' is increased in the regions of the edges 54 and 56. If the eddy current damper 40' is used as the eddy current damper 32 in the long-range optical device 10 in FIG. 1, a larger displacement of the carrier 22, and therefore of the eddy current carrier 48', relative to the magnet system 42 causes an increase in the induced eddy currents and therefore an increase in the restoring force, or damping. The increase in the thickness D from the middle 52 toward the edges 54, 56 in this case determines the increase factor of the damping as a function of the displacement of the eddy current carrier 48'.

In the embodiment in FIG. 2b), the thickness D increases continuously from the middle 52 toward the edges 54, 56.

Surfaces 58 and 60 of the eddy current carrier 48', which face toward the magnet system 42, have a continuous curvature in the exemplary embodiment in FIG. 2b). The radius of curvature of the curvatures of the surfaces 58 and 60 may be constant over the plate of the eddy current carrier 48'; for example, the surfaces 58, 60 may be spherically curved. Alternatively, depending on the desired damping characteristic, increasing or decreasing radii of curvature may be envisioned with an increasing distance from the middle 52.

FIG. 2c) shows a variant of the eddy current carrier 48' in FIG. 2b), in the form of an eddy current carrier 48" in which the thickness D increases stepwise rather than continuously from the middle 52" toward the edges 54" and 56". The surfaces 58" and 60" of the eddy current carrier 48" are correspondingly formed in steps.

The description above of FIGS. 2a) to c) related to a one-dimensional consideration of the dependency of the damping characteristic of the eddy current dampers 40 on the amplitude of the displacement of the movable optical element 16, and therefore of the respective eddy current carrier 48, 48' or 48".

In FIGS. 3a) to e), the eddy current carriers and therefore the damping characteristic of the eddy current dampers 40 are now considered not only as a function of the amplitude of the displacement, but also as a function of the direction of the displacement of the respective eddy current carrier 48, 48' or 48", i.e. two-dimensionally.

FIGS. 3a) to e) show thickness profiles in the x-y plane of the eddy current carriers in the form of iso-thickness lines. FIG. 3a) shows the case of the configuration of the eddy current carrier 48 in FIG. 2a) as a plane-parallel plate. Correspondingly, the eddy current carrier 48 has a constant thickness over its entire surface.

FIG. 3b) shows the eddy current carrier 48' with a thickness increase from the middle 52 to the edges 54, 56 or 54a, 54b, which is symmetrical in the x direction and in the y direction. Lines 62 are in this case lines of equal thickness. The thickness profile, or the thickness topography, of the eddy current carrier 48' in FIG. 3c) is square.

FIG. 3c) shows a thickness profile of the eddy current carrier 48', which is likewise symmetrical in the x and y directions, the thickness profile being circular here.

In the exemplary embodiments according to FIGS. 3b) and c), although the damping characteristic, or restoring force, of the eddy current damper is dependent on the amplitude of the displacement of the eddy current carrier 48', it is not direction-dependent, i.e. a displacement of the eddy current carrier 48' is damped in the same way in the x direction and in the y direction.

In order to obtain a direction dependency of the damping, the damping behavior of the eddy current damper must be different in the direction of the x axis and in the direction of the y axis, as represented in FIGS. 3d) and e). In the exemplary embodiment in FIG. 3d), the thickness profile of the plate of the eddy current carrier 48' is rectangular, i.e. the lines 62 of equal thickness are rectangular. In the exemplary embodiment in FIG. 3d), the damping increases more strongly in the direction of the x axis than in the direction of the y axis.

FIG. 3e) shows an elliptical thickness profile, the damping here as well increasing more strongly in the direction of the x axis than in the direction of the y axis. The elliptical thickness profile according to FIG. 3e) has the advantage over the rectangular profile according to FIG. 3d) that a more uniform transition of the damping between a pure x displacement and a pure y displacement is produced in the event of simultaneous displacement of the eddy current carrier 48' in the y and x directions.

The considerations above assume that the eddy current carrier 48, 48' or 48" executes an exactly linear movement relative to the magnet system 42. This consideration is valid only for small displacements of the carrier 22 of the long-range optical device 10 in FIG. 1. In the event of larger displacements of the carrier 22, it is necessary to take into account the fact that the carrier 22 executes a swiveling movement about a rotation point owing to its mounting by the spring joint 26. Since the eddy current damper 32 of the long-range optical device 10 is arranged at an end of the carrier 22 remote from the bearing or rotation point of the spring joint 26, the eddy current carrier 38 describes a trajectory on a spherical surface concentric with the rotation point of the carrier 22.

The way in which adaptation of the eddy current damper in one of the embodiments according to FIGS. 2a) to c) to the spherically curved trajectory of the carrier 22 can be carried out will be described below with reference to FIGS. 4a) to f).

FIGS. 4a), b) and c) show the eddy current dampers 40, 40' and 40" according to FIGS. 2a), b) and c).

A feature common to the eddy current carriers 48 in FIG. 4a), 48' in FIGS. 4b) and 48" in FIG. 4c) is that their radial midaxes 64, 64' and 64", respectively, between the surfaces 58, 60; 58', 60'; 58", 60" are straight. Adaptation to the actual movement of the eddy current carrier 48, 48' or 48" along a sphere is carried out by the respective radial midaxis 64, 64' or 64" being curved concentrically with respect to the rotation point of the movement of the carrier 22, as represented in FIGS. 4d), e) and f).

In other words, a spherical curvature concentric with the rotation point of the carrier 22 is superimposed on the geometries of the eddy current carriers 48, 48' and 48" according to FIGS. 4a), b) and c), so as to obtain the geometries of the eddy current carriers 48, 48', 48" as shown in FIGS. 4d), e) and f).

In this case, not only the eddy current carriers 48, 48' and 48" themselves, but also the magnets 44, 46 of the magnet system 42 are curved concentrically with the rotation point of the carrier 22.

A dependency of the restoring force, or of the damping, on the displacement of the movable optical element 16 may also be achieved by means of the curvature of the magnet 44 and/or of the magnet 46, even if the eddy current carrier itself is formed as a plate without thickness variation. This is illustrated in FIGS. 5a) and b).

FIG. 5a) shows the eddy current damper 40 according to FIG. 4d), in which the magnets 44 and 46 of the magnet system 42 are curved concentrically with respect to the rotation point 66, which represents the rotation point of the carrier 22 in FIG. 1, as is the eddy current carrier 48. Expressed more precisely, the surfaces 58 and 60 of the eddy current carrier 48 have radii of curvature r1 and r2 which, together with radii of curvature r3 of a surface 68 of the magnet 46 and r4 of a surface 70 of the magnet 44, are all concentric with the rotation point 66. In this way, there is no displacement dependency of the damping characteristic of the eddy current damper 40.

A displacement dependency of the damping characteristic of the eddy current damper 40 may, however, be achieved according to FIG. 5b) by the symmetry of the curvatures of the eddy current carrier 48 and of the magnet system 42 being broken in such a way that the distance from the eddy current carrier 48 to the magnet 44 and/or to the magnet 46 varies over the eddy current carrier 48. While the radii of curvature r1 and r2 continue to extend concentrically with the rotation point 66, the radii of curvature r3 and r4 are not concentric with the rotation point 66, the radius of curvature r3 being ∞. In this way, even with an eddy current carrier 48 in the form of a plate which has a constant thickness over its surface, it is possible to achieve a displacement dependency of the damping characteristic of the eddy current damper 40.

Figure 8:
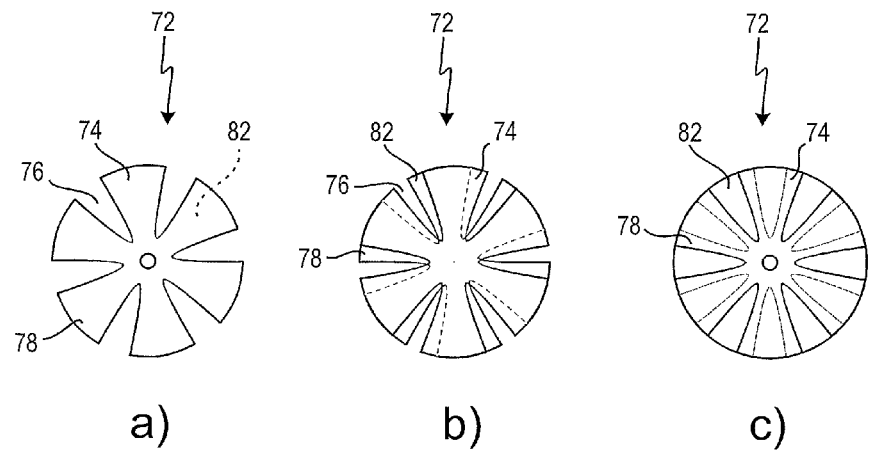
FIGS. 6, 7 and 8a) to c)
show another embodiment of an eddy current carrier for an eddy current damper for use in the long-range optical device in FIG. 1.

The way in which the restoring force, or damping characteristic, of the eddy current damper can be made adjustable will be described below with reference to FIGS. 6 to 8. The adjustability of the restoring force, or damping characteristic, is achieved in the exemplary embodiment described below by modification of the eddy current carrier.

Figures 6, 7:
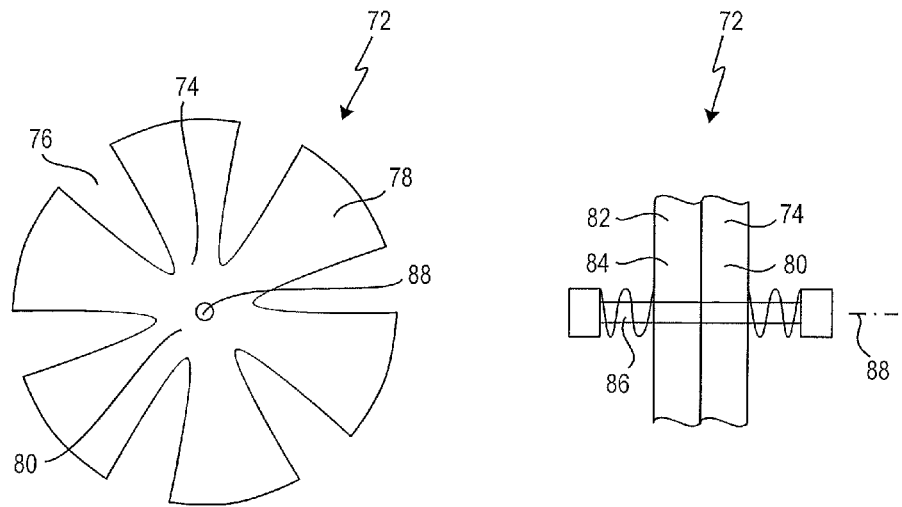

FIGS. 6 and 7 show an eddy current carrier 72 that has a first plate 74, which is provided with a multiplicity of radial recesses, there being a total of six such radial recesses 76 in the exemplary embodiment shown. The plate 74 has a multiplicity of radial segments 78, corresponding to the radial recesses 76, which are connected to one another only in the region of the middle 80 of the plate 74 and form an essentially continuous surface there. The plate 74 is formed overall so as to be electrically conductive.

According to FIG. 7, the eddy current carrier 72 has a second plate 82 which is formed in the same way as the first plate 74, i.e. it correspondingly has a multiplicity of radial recesses 76 and correspondingly a multiplicity of segments 78. In FIG. 7, the two plates 74 and 82 are shown only in the region of their middle 80 and 84, respectively.

The two plates 74 and 82 are installed in the optical channel 12 of the long-range optical device 10 in such a way that they are arranged bearing on one another in the longitudinal direction, or in the direction of the optical axis 23 of the optical channel 12, while touching in a flat manner. The second plate 84 is likewise electrically conductive, so that the two plates 82 and 74 according to FIG. 7 are connected electrically conductively to one another.

The two plates 74 and 82 are fastened to one another by means of a spring-loaded fastening arrangement 86, although the two plates 74 and 82 can be rotated relative to one another about a rotation axis 88.

FIG. 8a) in turn shows a relative position of the two plates 74 and 82 (the plate 82 lying behind the plane of the drawing), in which the segments 78 of the plate 74 are congruent with the corresponding segments of the plate 82, and the radial recesses 76 of the plate 74 are congruent with the corresponding radial recesses of the plate 82. In this relative position, only small eddy currents are formed in the individual segments 78 of the plate 74 and in the corresponding segments 78 of the plate 82, since the radial recesses 76 of the two plates 74 and 82 impede the formation of eddy currents.

FIG. 8b) in turn shows a relative position of the two plates 74 and 82 with respect to one another, in which the total surface of the radial recesses 76 is reduced by rotation of the plate 82 relative to the plate 74. In this relative position, larger eddy currents can now propagate in the eddy current carrier 72, compared with FIG. 8a). The restoring force, or damping, is now greater compared with FIG. 8a).

FIG. 8c) shows a relative position of the two plates 74 and 82, in which the segments 78 of the plate 82 fully cover the radial recesses 76 of the plate 74, and vice versa. In this relative position of the two plates 74 and 82, maximum eddy currents can now be formed in the eddy current carrier 72, and the damping is now maximum.

It is to be understood that the configuration of the eddy current carrier 72 may be combined with the exemplary embodiments described above, that is to say at least one of the two plates 74 and 82 may be formed with a thickness variation over its surface.

In the previous exemplary embodiments, the plates of the eddy current carriers 48, 48', 48" and 72 are preferably formed so as to be electrically conductive as a whole, and may for example be made of copper.

Instead of achieving a displacement dependency of the damping characteristic of the eddy current dampers 40 by means of the geometry (thickness variations and the like) of the eddy current carriers 48, 48', 48", 72 or of the magnet system 42, as an alternative or in addition this may also be achieved by means of a corresponding material selection of the eddy current carriers 48, 48', 48", 72, for example by the electrical conductivity in the eddy current carriers 48, 48', 48" or 72 and/or the permeability of the eddy current carriers 48, 48', 48", 72 being configured position-dependently.

Further configurations of eddy current dampers, in which the plate of the eddy current carrier is not itself electrically conductive, but in which the plate of the eddy current carrier may be made of an electrically nonconductive material and carry at least one coil, in which the eddy currents are generated, will be described below with reference to FIGS. 9 and 10.

FIG. 9a) again shows the eddy current damper 40 according to FIG. 2a).

FIG. 9b) shows an eddy current damper 90 having the magnet system 42 of the eddy current damper 40, but having an eddy current carrier 92 which comprises a plate 94 of electrically nonconductive material, and which carries one or more coils 96.

The one or more coils 96 may be formed as a coiled wire or as a wound wire passing through the plate 94, as represented in FIG. 9c). In the event of a relative movement of the eddy current carrier 92 relative to the magnet system 42, corresponding eddy currents are generated in the conductive wires of the coils 96.

The one or more coils 96 may also be applied as conductive tracks on the otherwise electrically nonconductive plate 94.

While the damping characteristic of the eddy current damper 90 does not have a dependency on the displacement of the eddy current carrier 92 relative to the magnet system 42 in the exemplary embodiment in FIGS. 9b) and 9c), FIG. 10 shows an eddy current damper 90' having a displacement-dependent damping characteristic.

Firstly, FIG. 10a) once more shows the eddy current damper 40' of FIG. 2b), in which the displacement dependency of the restoring force, or damping, is produced by a thickness variation of the electrically conductive plate of the eddy current carrier 48'.

FIG. 10b) shows an eddy current damper 90' having a damping characteristic which corresponds to the damping characteristic of the eddy current damper 40' in FIG. 10a), but which is produced not by a thickness variation of the eddy current carrier 92' but by a position-dependent distribution of coils 96' on an electrically nonconductive plate 94', which according to FIG. 10c) may again be configured as wound wires passing through the 94'.

The displacement dependency of the damping characteristic, or the restoring force, of the eddy current damper 90' is achieved by a position dependency of the number of windings, the winding cross section and/or the cross section of the conductive wire of the coils, so that a damping effect similar to the thickness variation of the eddy current carrier 48' can be achieved.

The plate 94' may be formed as a plane-parallel plate or as a spherically curved carrier plate, similarly as represented in FIG. 4e).

A direction dependency of the restoring force, or damping characteristic, of the eddy current damper 90' in the x direction and in the y direction can be achieved by the plate 94' carrying at least two coils 96', in which eddy currents are generated and which are oriented in different spatial directions to one another (x and y), as can also be seen in FIG. 10c). The coils for the x direction and for the y direction may in this case be configured separately, so that direction-dependent damping can be produced. By connecting these separate coils, with or without an additional resistor, the two directions x and y can be coupled together. For the case in which an additional resistor is used for coupling the coils for the x direction and for the y direction, such an electrical resistor is preferably adjustable, so that the damping of the eddy current damper 90' can be varied manually, either when assembling the long-range optical device 10 or during use by the user.

The exemplary embodiments so far relate essentially to different configurations of the respective eddy current carrier, for achieving a desired damping characteristic of the eddy current damper.

Figure 11:
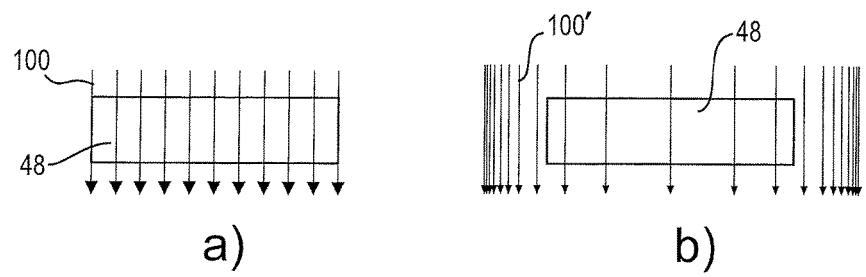
FIG. 11a) shows the eddy current carrier of the eddy current damper in FIG. 2a) and FIG. 11b) shows a variant of the arrangement in FIG. 11a)
Figure 12:
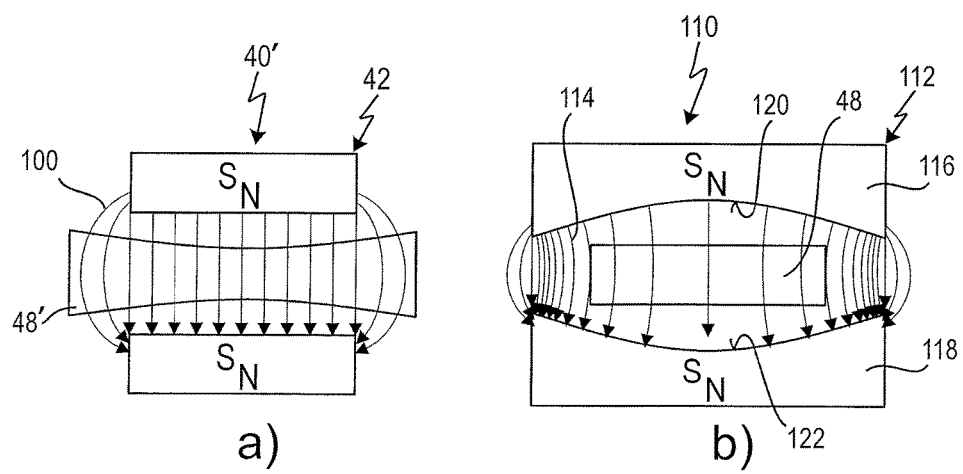
FIG. 12a) shows the eddy current damper in FIG. 2b) and
FIG. 12b) shows a variant of the eddy current damper in FIG. 12a)

Conversely, modifications of the magnet system which likewise make it possible to achieve a displacement-dependent (and additionally also direction-dependent) damping characteristic of the eddy current damper will be described with reference to FIGS. 11 to 13.

FIG. 11a) shows a part of the eddy current damper 40 according to FIG. 2a) in the region of the eddy current carrier 48, field lines 100 of the magnetic field generated by the magnet system 42 (see FIG. 2a)), which pass through the eddy current carrier 48, additionally being represented. According to the representation in FIG. 11a), the magnetic field generated by the magnet system 42 is homogeneous over the eddy current carrier 48.

A displacement-dependent restoring force, or damping, by eddy currents of different strengths generated in the eddy current carrier 48, is produced here by the magnetic field generated by the magnet system, the field lines of which is illustrated in FIG. 11b) by arrows 100', being inhomogeneous over the eddy current carrier 48. In other words, in order to achieve a displacement-dependent damping with the eddy current carrier 48 formed as a plane-parallel plate, the magnetic field line density must vary over the extent of the magnet system. Furthermore, in this case the eddy current carrier 48 should be smaller than the lateral (radial) extent of the magnetic field, as shown in FIG. 11b).

If, with increasing displacement, the eddy current carrier 48 enters the regions of the magnetic field which lie further outward, the magnetic flux density changes, so that the induced eddy current also changes and the damping becomes displacement-dependent, as in the case of the eddy current carrier 48' in FIG. 2b) or 48" in FIG. 2c).

This effect can be enhanced by a position-dependent thickness profile of the eddy current carrier 48, as in the case of the eddy current carrier 48' in FIG. 2b) or 48" in FIG. 2c).

FIG. 12a) shows the eddy current damper 40' of FIG. 2b), the field lines 100 of the magnetic field generated by the magnet system 42 additionally being indicated. As described above, in the eddy current damper 40' there is a displacement-dependent damping, or restoring force, due to a thickness variation of the plate of the eddy current carrier 48'. A damping characteristic similar to that of the eddy current damper 40' can be achieved with an eddy current damper 110 which has the eddy current carrier 48 according to FIG. 2a) or FIG. 11b) instead of the eddy current carrier 48', the displacement dependency now being achieved, in contrast to FIG. 12a), by an inhomogeneity of the magnetic field generated by the magnet system 112, the field lines of which are provided with the reference 114. In accordance with the principle according to FIG. 11b), the magnetic field generated by the magnet system 112 is inhomogeneous over the eddy current carrier 48, and the magnet system 12, or the magnetic field generated thereby, has a greater lateral (radial) extent than the eddy current carrier 48, as shown in FIG. 12b).

The inhomogeneity of the magnetic field generated by the magnet system 112 is produced in the exemplary embodiment according to FIG. 12b) by a corresponding geometry of magnets 116, 118. The mutually opposing surfaces 120 and 122 of the magnets 116 and 118 are curved concavely so that the internal distance between the magnets 116 and 118 is smaller toward the edge than in the middle of the magnets 116 and 118.

Figure 13:
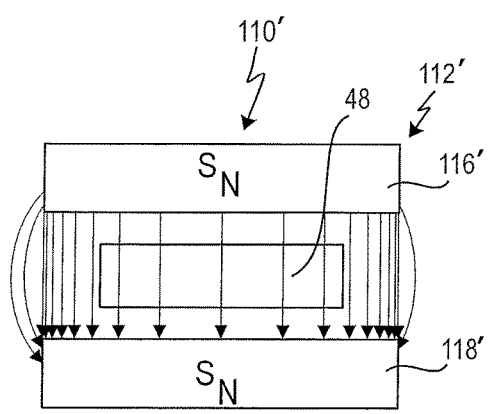
FIG. 13 shows a variant of the eddy current damper in FIG. 12b).

FIG. 13 shows a variant of the eddy current damper 110, in the form of an eddy current damper 110' in which the position-dependently varying magnetic field line density of the magnetic field generated by the magnet system 112' is obtained not by a geometry of the magnets 116' and 118' differing from plane-parallel magnets, but by a position-dependently varying magnetic remanence, which can be achieved by a corresponding material selection or material distribution in the magnets 116 and/or 118'.

In a similar way to the descriptions above of the additional direction dependency of the damping characteristic of the eddy current damper 110 or 110', such a direction dependency of the damping characteristic may be achieved in the eddy current damper 110 by a geometry of the magnets 116, 118 which is correspondingly adapted in the x and y directions, or by a material distribution of the magnets 116' or 118' which is correspondingly adapted in the x and y directions.

In a similar way to the exemplary embodiments according to FIGS. 9 and 10, instead of permanent magnets, the magnet systems 42, 112 or 112' may also be produced using coils, that is to say electromagnets. The modifications described for achieving a displacement dependency of the damping characteristic, and optionally the additional direction dependency of the damping characteristic, apply similarly for this. It is also possible to generate inhomogeneous magnetic fields with coils instead of permanent magnets, as described above, and an additional direction dependency of the inhomogeneity of the magnetic field may be generated by at least two coils which can be excited with different current strengths, the coil axes of which are oriented in mutually perpendicular directions.

It is to be understood that all exemplary embodiments mentioned above may be combined with one another. For example, an eddy current carrier plate becoming thicker outward may additionally be provided with a coil and a recess for the beam to pass through.

The exemplary embodiments described with reference to FIGS. 8 to 12, which use eddy current carriers with coils, may be modified in such a way that the coils are actively supplied with current, so that the image stabilization can be actively controlled by magnet/magnet interactions between the permanent magnets and the electromagnets.

While the exemplary embodiments described above assume that the damping increases with increasing displacement of the carrier 22, and therefore of the movable optical element 16, provision may however also be made for the damping, or restoring force, of the respective eddy current damper to decrease with an increasing displacement. In the eddy current damper 40' in FIG. 2d), for example, this may be achieved by the thickness of the plate of the eddy current carrier 48' decreasing rather than increasing toward the edge.

What is claimed is:

1. A long-range optical device, comprising at least one optical channel having a housing and an arrangement of optical elements,
at least one of the optical elements being movable relative to the housing for image stabilization in the event of perturbing movements of the housing,
a carrier movable relative to the housing,
a stabilization system for the at least one movable optical element, the stabilization system having an eddy current damper for damping movements of the at least one movable element,
the eddy current damper in the event of a displacement of the at least one movable optical element generating a restoring force proportional to the displacement velocity of the at least one movable optical element,
the restoring force being dependent on an amplitude of the displacement of the at least one movable optical element,
the eddy current damper having a magnet system and an eddy current carrier interacting with the magnet system, wherein the magnet system has at least one magnet extending radially with respect to a longitudinal axis of the optical channel, and the at least one magnet has at least one surface which is curved, in such a way that a distance from the plate to the at least one magnet varies over the plate.

2. The device of claim 1, wherein the restoring force is adjustable.

3. The device of claim 1, wherein the restoring force increases or decreases with an increasing amplitude of the displacement.

4. The device of claim 1, wherein the restoring force is dependent on the direction of the displacement of the at least one movable optical element.

5. The device of claim 4, wherein the restoring force is equal in two mutually perpendicular direction components of the displacement of the at least one movable optical element.

6. The device of claim 4, wherein the restoring force is different in two mutually perpendicular direction components of the displacement of the at least one movable optical element.

7. The device of 1, wherein the eddy current carrier comprises at least one plate having two surfaces and extending radially with respect to the longitudinal axis of the optical channel, the plate having an edge.

8. The device of claim 7, wherein a thickness of the plate increases or decreases toward the edge.

9. The device of claim 8, wherein the thickness of the plate increases or decreases continuously or stepwise toward the edge.

10. The device of claim 8, wherein the thickness of the plate increases or decreases equally in two mutually perpendicular spatial directions toward the edge.

11. The device of claim 8, wherein the thickness of the plate increases or decreases differently in two mutually perpendicular spatial directions toward the edge.

12. The device of claim 8, wherein the plate has one of: a rectangular shape, a square shape, a circular shape, and an elliptical shape and wherein a thickness profile of the plate increases or decreases toward the edge.

13. The device of claim 7, wherein at least one of the surfaces of the plate is curved, a radius of curvature of the at least one surface being constant or variable over the at least one surface.

14. The device of claim 7, wherein a radial midaxis between the two surfaces of the plate is straight.

15. The device of claim 7, wherein the plate has a first plate and a second plate, each of which is provided with radial recesses, and the first plate and the second plate are arranged next to one another in a longitudinal direction of the optical channel and are positionally adjustable relative to one another, in order to enlarge or reduce the radial recesses reciprocally in terms of their area.

16. The device of claim 7, wherein the plate is electrically conductive.

17. The device of claim 16, wherein at least one of an electrical conductivity and a magnetic permeability of the plate varies over the plate.

18. The device of claim 1, wherein the magnet system generates a magnetic field, a portion of which acts with the eddy current carrier to provide an inhomogeneous magnetic field.

19. The device of claim 18, wherein the magnet system comprises at least one magnet having a geometry selected such that the at least one magnet generates the inhomogeneous magnetic field in connection with acting with the eddy current carrier.

20. The device of claim 19, wherein the at least one magnet has a position-dependent remanence.

21. The device of claim 18, wherein the magnet system comprises at least one coil which can be excited by a current, in order to generate an inhomogeneous magnetic field.

22. The device of claim 21, wherein the magnet system comprises at least two coils which can be excited by different current strengths.

23. The device of claim 7, wherein a radial midaxis between the two surfaces of the plate is curved.

24. A long-range optical device, comprising:
at least one optical channel having a housing and an arrangement of optical elements,
at least one of the optical elements being movable relative to the housing for image stabilization in the event of perturbing movements of the housing,
a carrier movable relative to the housing,
a stabilization system for the at least one movable optical element, the stabilization system having an eddy current damper for damping movements of the at least one movable element, the eddy current damper in the event of a displacement of the at least one movable optical element generating a restoring force proportional to the displacement velocity of the at least one movable optical element, the restoring force being dependent on an amplitude of the displacement of the at least one movable optical element,
the eddy current damper having a magnet system and an eddy current carrier interacting with the magnet system, the magnet system being fixed with respect to the housing and the eddy current carrier being fixed with respect to the carrier, wherein the eddy current carrier comprises at least one plate having two surfaces and extending radially with respect to the longitudinal axis of the optical channel, the plate having an edge and wherein the plate is not electrically conductive, and carries at least one coil in which eddy currents are generated.

25. The device of claim 24, wherein the at least one coil is formed as a conductive wire which is coiled or wound through the plate.

26. The device of claim 24, wherein the at least one coil is formed as a conductive track on the plate.

27. The device of claim 24, wherein at least one of a number of windings, a winding cross section and a conductive wire or conductive track cross section of the at least one coil varies over the plate.

28. The device of claim 24, wherein the plate carries at least two coils in which eddy currents are generated, and the at least two coils are oriented in different spatial directions to one another.

29. The device of claim 28, wherein the at least two coils are electrically coupled to one another via a resistor.

30. The device of claim 29, wherein the resistor is adjustable.

31. A long-range optical device, comprising at least one optical channel having a housing and an arrangement of optical elements,
at least one of the optical elements being movable relative to the housing for image stabilization in the event of perturbing movements of the housing,
a stabilization system for the at least one movable optical element, the stabilization system having an eddy current damper for damping movements of the at least one movable element,
the eddy current damper in the event of a displacement of the at least one movable optical element generating a restoring force proportional to the displacement velocity of the at least one movable optical element,
the restoring force being dependent on an amplitude of the displacement of the at least one movable optical element, the restoring force being adjustable,
the eddy current damper having a magnet system,
wherein the magnet system has at least one magnet extending radially with respect to a longitudinal axis of the optical channel, and the at least one magnet has at least one surface which is curved, in such a way that a distance from the plate to the at least one magnet varies over the plate.

32. A long-range optical device, comprising at least one optical channel having a housing and an arrangement of optical elements,
at least one of the optical elements being movable relative to the housing for image stabilization in the event of perturbing movements of the housing,
a stabilization system for the at least one movable optical element, the stabilization system having an eddy current damper for damping movements of the at least one movable element,
the eddy current damper in the event of a displacement of the at least one movable optical element generating a restoring force proportional to the displacement velocity of the at least one movable optical element,
the restoring force being dependent on an amplitude of the displacement of the at least one movable optical element,
the eddy current damper having a magnet system and an eddy current carrier interacting with the magnet system,
wherein the magnet system has at least one magnet extending radially with respect to a longitudinal axis of the optical channel, and the at least one magnet has at least one surface which is curved, in such a way that a distance from the plate to the at least one magnet varies over the plate,
the magnet system generating an inhomogeneous a magnetic field, a portion of which acts with over the eddy current carrier to provide an inhomogeneous magnetic field.

33. The device of claim 32, wherein the magnet system comprises at least one magnet having a geometry selected such that the at least one magnet generates an inhomogeneous magnetic field.

34. The device of claim 33, wherein the at least one magnet has a position-dependent remanence.

35. The device of claim 32, wherein the magnet system comprises at least one coil which can be excited by a current, in order to generate an inhomogeneous magnetic field.

36. The device of claim 35, wherein the magnet system comprises at least two coils which can be excited by different current strengths.

37. The device of claim 32, wherein the at least one movable optical element is fastened on a carrier which is movable relative to the housing, and in that the magnet system is fixed with respect to the housing and the eddy current carrier is fixed with respect to the carrier.

38. The device of claim 32, wherein the restoring force is adjustable.

\* \* \* \* \*